US012617402B2

(12) United States Patent
Saito et al.

(10) Patent No.: US 12,617,402 B2
(45) Date of Patent: May 5, 2026

(54) VEHICLE CONTROL METHOD AND VEHICLE CONTROL DEVICE

(71) Applicant: Nissan Motor Co., Ltd., Yokohama (JP)

(72) Inventors: Shinya Saito, Kanagawa (JP); Yasuhisa Taira, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 18/842,646

(22) PCT Filed: Mar. 9, 2022

(86) PCT No.: PCT/JP2022/010301
§ 371 (c)(1),
(2) Date: Aug. 29, 2024

(87) PCT Pub. No.: WO2023/170820
PCT Pub. Date: Sep. 14, 2023

(65) Prior Publication Data
US 2025/0171024 A1     May 29, 2025

(51) Int. Cl.
*B60W 30/18* (2012.01)
*B60W 30/08* (2012.01)

(52) U.S. Cl.
CPC ...... *B60W 30/18009* (2013.01); *B60W 30/08* (2013.01); *B60W 2552/20* (2020.02); *B60W 2720/103* (2013.01)

(58) Field of Classification Search
CPC ........... B60W 30/18009; B60W 30/08; B60W 2552/20; B60W 2720/103;
(Continued)

(56) References Cited

U.S. PATENT DOCUMENTS

2010/0161192 A1*  6/2010  Nara ............... B60W 30/18145
701/1
2016/0347324 A1*  12/2016  Yoshitomi ............. B60W 40/04
(Continued)

FOREIGN PATENT DOCUMENTS

JP        2011-088574 A      5/2011
JP        2018-203006 A      12/2018
(Continued)

*Primary Examiner* — Sizo B Vilakazi
(74) *Attorney, Agent, or Firm* — Young Basile Hanlon & MacFarlane, P.C.

(57) ABSTRACT

A vehicle control device operates to: obtain road information of a subject vehicle traffic lane in which the subject vehicle travels and road information of a branching traffic lane branching from the subject vehicle traffic lane when the branching traffic lane is present in a traveling direction of the subject vehicle; determine whether driver operation information indicating an intention of traveling in a planned traveling lane on the planned traveling route has been obtained or not, with the branching traffic lane as the planned traveling lane; determine whether a road structure requiring deceleration of the subject vehicle is present in the planned traveling lane; and perform a deceleration control of the subject vehicle based on the road information when determining that the driver operation information has been obtained and determining that the road structure requiring deceleration of the subject vehicle in the planned traveling lane is present.

5 Claims, 4 Drawing Sheets

(58) Field of Classification Search
CPC ..... B60W 2050/0068; B60W 2520/10; B60W
2540/18; B60W 2540/20; B60W
2540/215; B60W 2552/53; B60W
2555/60; B60W 2720/10; B60W
2720/106; B60W 30/18163
See application file for complete search history.

(56) References Cited

U.S. PATENT DOCUMENTS

| | | | |
|---|---|---|---|
| 2018/0345967 A1 | 12/2018 | Oniwa | |
| 2019/0138024 A1* | 5/2019 | Liang | G06N 3/0464 |
| 2019/0152491 A1* | 5/2019 | Arai | B60W 50/082 |
| 2019/0291733 A1* | 9/2019 | Limbacher | B60W 50/14 |
| 2020/0114917 A1* | 4/2020 | Oguro | B60W 30/181 |
| 2020/0189586 A1* | 6/2020 | Choi | B60W 50/14 |
| 2022/0017076 A1 | 1/2022 | Suzuki | |
| 2025/0296568 A1* | 9/2025 | Jansen | B62D 15/0255 |

FOREIGN PATENT DOCUMENTS

| | | | |
|---|---|---|---|
| JP | 2020-069953 A | 5/2020 | |
| JP | 2020-185929 A | 11/2020 | |
| JP | 2022-019244 A | 1/2022 | |

* cited by examiner

VEHICLE CONTROL METHOD AND VEHICLE CONTROL DEVICE

TECHNICAL FIELD

The present invention relates to a vehicle control method and a vehicle control device.

BACKGROUND

There has been known a technique that operates a deceleration controlled variable when a subject vehicle travels on a curve road, and decelerates the subject vehicle in accordance with the deceleration controlled variable (Japanese Unexamined Patent Application Publication No. 2020-69953).

In Japanese Unexamined Patent Application Publication No. 2020-69953, a target vehicle speed is set so as to be decreased as an anticipated curvature increases based on the anticipated curvature of a subject vehicle lane in a location ahead by a predetermined distance of the current location of the subject vehicle, and a base deceleration controlled variable is corrected to be decreased as a vehicle speed deviation obtained by subtracting the current vehicle speed of the subject vehicle from the target vehicle speed is large, and thus, the deceleration controlled variable is calculated.

SUMMARY

For example, in a situation where a subject vehicle traffic lane in which a subject vehicle travels is branched and a planned traveling route of the subject vehicle is set to the subject vehicle traffic lane, a driver does not necessarily drive as the planned traveling route. The technique in Japanese Unexamined Patent Application Publication No. 2020-69953 is not a technique of obtaining information indicating an intention of the driver whether to drive as the planned traveling route or not in such a situation. Therefore, the technique in Japanese Unexamined Patent Application Publication No. 2020-69953 fails to perform a deceleration control of the subject vehicle corresponding to the intention of the driver when a road structure requiring deceleration of the subject vehicle is present in the traffic lane in the branch side.

A problem to be solved by the present invention is to provide a vehicle control method and a vehicle control device that enables deceleration of a subject vehicle corresponding to an intention of a driver of driving on a planned traveling route when a road structure requiring deceleration of the subject vehicle is present in a traffic lane in a planned traveling route side in a situation where a branch side traffic lane branching from a subject vehicle traffic lane in which the subject vehicle travels is present.

The present invention solves the above-described problem by: obtaining road information of a subject vehicle traffic lane in which the subject vehicle travels and road information of a branching traffic lane branching from the subject vehicle traffic lane when the branching traffic lane is present in a traveling direction of the subject vehicle on the planned traveling route; determining whether driver operation information by a driver of the subject vehicle indicating an intention of traveling in a planned traveling lane on the planned traveling route has been obtained or not, with the branching traffic lane as the planned traveling lane; determining whether a road structure requiring deceleration of the subject vehicle is present or not in the planned traveling lane based on road information of the planned traveling lane; and performing a deceleration control of the subject vehicle based on the road information of the planned traveling lane and vehicle information of the subject vehicle when determining that the driver operation information has been obtained and determining that the road structure requiring deceleration of the subject vehicle is present in the planned traveling lane.

The present invention enables deceleration of a subject vehicle corresponding to an intention of a driver of driving on a planned traveling route when a road structure requiring deceleration of the subject vehicle is present in a traffic lane in a planned traveling route side in a situation where a branch side traffic lane branching from a subject vehicle traffic lane in which the subject vehicle travels is present.

DETAILED DESCRIPTION

Figure 1:
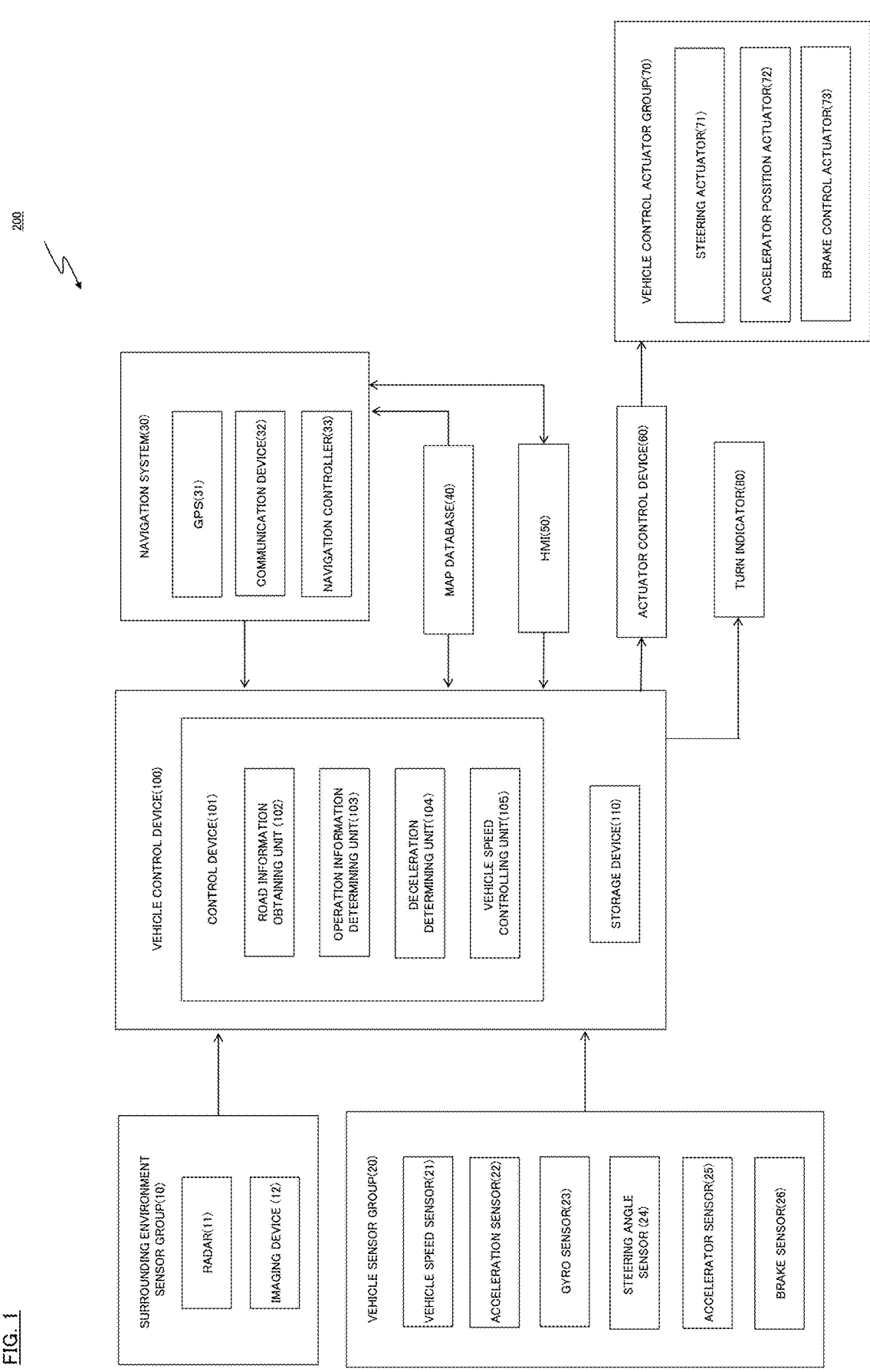
FIG. 1 is a drawing illustrating an exemplary configuration of a vehicle control device according to an embodiment.

The following describes an embodiment of the present invention based on the drawings. Note that the embodiment will be described with a vehicle control device mounted on a vehicle as an example. FIG. 1 is a block diagram illustrating an exemplary vehicle system 200 including a vehicle control device 100 according to the embodiment of the present invention. The vehicle system 200 of the embodiment is mounted on a vehicle.

As illustrated in FIG. 1, the vehicle system 200 according to the embodiment includes a surrounding environment sensor group 10, a vehicle sensor group 20, a navigation system 30, a map database 40, an HMI 50, an actuator control device 60, a vehicle control actuator group 70, a turn indicator 80, and the vehicle control device 100. These devices or systems are connected via any in-vehicle LAN including CAN for mutually transmitting and receiving information.

The surrounding environment sensor group 10 is a sensor group that detects a state in a periphery of a subject vehicle (an external state) and is disposed in the subject vehicle. While, as illustrated in FIG. 1, examples of the surrounding environment sensor group 10 include a radar 11 and an imaging device 12, the examples are not limited to these.

The radar 11 detects objects existing in the periphery of the subject vehicle. While examples of the radar 11 include a milliwave radar and the like, the examples are not limited to these. Specifically, the radar 11 detects a direction in which an object exists and a distance to the object. The detection result detected by the radar 11 is output to the vehicle control device 100. In the embodiment, the radar 11 is omnidirectional in detection when the subject vehicle is set as the center. For example, the respective radars 11 are disposed in a front, sides, and a rear of the subject vehicle, and are configured to detect objects existing in the front, the sides, and the rear of the subject vehicle.

The imaging device 12 obtains images of the objects existing in the periphery of the subject vehicle. While examples of the imaging device 12 include a camera including a CCD or CMOS image sensor, the examples are not limited to this. The captured image captured by the imaging device 12 is output to the vehicle control device 100. In the embodiment, the imaging device 12 is omnidirectional in detection when the subject vehicle is set as the center. For example, the respective imaging devices 12 are disposed in the front, the sides, and the rear of the subject vehicle, and are configured to detect objects existing in the front, the sides, and the rear of the subject vehicle.

Examples of the objects detected by the surrounding environment sensor group 10 include bicycles, motorbikes, automobiles (hereinafter, also referred to as other vehicles), road obstacles, traffic light machines, road markings (including traffic lane lines), and crosswalks. The imaging device 12 captures an image with which a type of another vehicle, a size of the other vehicle, and a shape of the other vehicle are identifiable.

For example, when the subject vehicle travels in a certain traffic lane among a plurality of traffic lanes, the radar 11 detects a traffic lane line that separates between the traffic lane in which the subject vehicle travels and the traffic lane located in a side of this traffic lane, and detects a distance from the subject vehicle to the traffic lane line. The imaging device 12 captures an image with which a type of the traffic lane line is identifiable. Note that when traffic lane lines are present on both sides of the subject vehicle traffic lane, the radar 11 detects a distance from the subject vehicle to the traffic lane line for each traffic lane line. In the following description, the traffic lane in which the subject vehicle travels is also referred to as a subject vehicle traffic lane, and the traffic lane located in the side of the subject vehicle traffic lane is also referred to as an adjacent traffic lane.

The vehicle sensor group 20 is a sensor group that detects a state of the subject vehicle (an internal state). While, as illustrated in FIG. 1, examples of the vehicle sensor group 20 include a vehicle speed sensor 21, an acceleration sensor 22, a gyro sensor 23, a steering angle sensor 24, an accelerator sensor 25, and a brake sensor 26, the examples are not limited to these.

The vehicle speed sensor 21 measures a rotation speed of a driving system, such as a drive shaft, and detects a traveling speed of the subject vehicle based on the measurement result. The vehicle speed sensor 21 is disposed in, for example, a wheel of the subject vehicle or the drive shaft that rotates integrally with the wheel. The acceleration sensor 22 detects an acceleration rate of the subject vehicle. The acceleration sensor 22 includes a front-rear acceleration sensor that detects an acceleration rate in a front-rear direction of the subject vehicle and a lateral acceleration sensor that detects a lateral acceleration of the subject vehicle. The gyro sensor 23 detects a rate at which the subject vehicle turns, that is, a moving amount (an angular speed) of an angle of the subject vehicle per unit time. The steering angle sensor 24 detects a steering angle of a steering wheel. The steering angle sensor 24 is disposed, for example, in the steering shaft of the subject vehicle. The accelerator sensor 25 detects a depression amount of an accelerator pedal (a position of the accelerator pedal). The accelerator sensor 25 is disposed, for example, in a shaft portion of the accelerator pedal. The brake sensor 26 detects a depression amount of a brake pedal (a position of the brake pedal). The brake sensor 26 is disposed, for example, in a shaft portion of the brake pedal.

The detection result detected by the vehicle sensor group 20 is output to the vehicle control device 100 as vehicle information. The detection result includes, for example, a vehicle speed of the subject vehicle, an acceleration rate (including a front-rear acceleration and a lateral acceleration), an angular speed, a depression amount of the accelerator pedal, and a depression amount of the brake pedal.

The navigation system 30 is a system that guides passengers (including a driver) of the subject vehicle by indicating a planned traveling route from the current position of the subject vehicle to a destination based on information of the current position of the subject vehicle. Map information is input to the navigation system 30 from the map database 40, and information of the destination is also input to the navigation system 30 from a passenger of the subject vehicle via the HMI 50. The navigation system 30 generates the planned traveling route of the subject vehicle based on these pieces of input information. The navigation system 30 outputs information of the planned traveling route of the subject vehicle to the vehicle control device 100, and presents the information of the planned traveling route of the subject vehicle to the passenger of the subject vehicle via the HMI 50. This presents the planned traveling route from the current position to the destination to the passenger.

As illustrated in FIG. 1, the navigation system 30 includes a GPS 31, a communication device 32, and a navigation controller 33.

The GPS 31 obtains position information indicating the current position of the subject vehicle. The GPS 31 receives radio waves transmitted from a plurality of satellite communications with a receiver to obtain the position information of the subject vehicle. The GPS 31 periodically receives the radio waves transmitted from the plurality of satellite communications to enable detecting changes in the position information of the subject vehicle.

The communication device 32 obtains a peripheral situation of the subject vehicle from the outside. The communication device 32 is, for example, a device communicable with a server or a system disposed outside the subject vehicle. The communication device 32 may communicate with a communication device mounted on another vehicle.

For example, the communication device 32 obtains road traffic information from Vehicle Information and Communication System (VICS (registered trademark), the same applies below) by information transmitting devices (beacons) disposed on the road, FM multiplex broadcasting, or the like. The road traffic information includes, for example, traffic congestion information, accident information, broken-down vehicle information, roadwork information, speed limit information, lane restriction information, and the like per unit of traffic lane. Note that the communication device 32 may obtain information including positions, vehicle speeds, and traveling directions of the other vehicles as the peripheral information of the subject vehicle from VICS.

The navigation controller 33 is a computer that generates the planned traveling route from the current position to the destination of the subject vehicle. For example, the navigation controller 33 is configured of a ROM storing programs for generating the planned traveling route, a CPU that executes the programs stored in this ROM, and a RAM that functions as an accessible storage device.

To the navigation controller 33, the information of the current position of the subject vehicle is input from the GPS 31, the road traffic information is input from the communication device 32, the map information is input from the map database 40, and information of the destination of the subject vehicle is input from the HMI 50. For example, assume that the passenger of the subject vehicle has set the destination of the subject vehicle via the HMI 50. The navigation controller 33 generates a route from the current position to the destination per unit of traffic lane as the planned traveling route of the subject vehicle based on the position information of the subject vehicle, the destination information of the subject vehicle, the map information, and the road traffic information. The navigation controller 33 outputs the generated planned traveling route information to the vehicle control device 100, and presents it to the passenger of the subject vehicle via the HMI 50.

Note that, in the embodiment, the planned traveling route of the subject vehicle is only necessary to be a route with which the subject vehicle can arrive at the destination from the current position, and the other conditions are not limited. For example, the navigation controller 33 may generate the planned traveling route of the subject vehicle in accordance with a condition set by the passenger. For example, the navigation controller 33 may generate the planned traveling route of the subject vehicle based on the road traffic information. For example, when a traffic jam is present in its course of the shortest route to the destination, the navigation controller 33 may search for a bypass route, and may generate a route with the shortest required period of time among a plurality of found bypass routes as the planned traveling route.

The map database 40 stores the map information. The map information includes the road information. The road information is information regarding roads on which vehicles are drivable. The road information is defined by nodes and links connecting between nodes (also referred to as a road link). The link is identified per unit of traffic lane.

The road information includes road structure information and traffic regulation information. While the road structure information is, for example, associated with any information regarding the road including a type of the road, a road width, a road shape, a curvature of the traffic lane, and an exit of an expressway per road link, the information associated with the road link is not limited to these. In addition, each road link is, for example, associated with any information regarding intersections including installation positions of traffic lights, positions of the intersections, entering directions of the intersections, and types of the intersections. In the embodiment, the road information may include information of the road structure requiring deceleration of the subject vehicle, such as a curve road, an exit to an ordinary road, and the like.

The traffic regulation information is a regulation regarding the traffic that should be complied with while vehicles are traveling. Each road link is associated with information of the traffic regulation in a zone defined by the road link. While examples of the traffic regulation include stop, parking/stop prohibition, speed reduction, a speed limit, and lane change prohibition on the route, the examples are not limited to these. For example, information of lane change prohibition is associated with the road link in a lane change prohibition zone. Note that the traffic regulation information may be associated not only with the road link, but may be associated with, for example, a node or a certain point on the map (a latitude, a route).

Here, automatic driving according to the embodiment will be described. In the embodiment, the automatic driving indicates a driving configuration other than the driving configuration in which a driving subject is configured only of a driver. For example, the case where a controller (not illustrated) that assists a driving operation is included in the driving subject together with the driver or the case where a controller (not illustrated) that executes a driving operation instead of the driver is included in the driving subject falls into the automatic driving. Note that the vehicle control device 100 according to the present invention is applicable not only to autonomous driving control, but is also applicable to a navigation system that assists a manual operation by a driver. When it is applied to the autonomous driving control, it is applicable not only to the case where both speed control and steering control are autonomously controlled but also to the case where one of the speed control and the steering control is autonomously controlled and the other is manually controlled.

While in the embodiment, the configuration in which the vehicle system 200 includes the map database 40 is described as an example, the map database 40 may be disposed outside the vehicle system 200. For example, the map information may be stored in advance in a portable storage device (for example, an external HDD and a flash memory). In this case, electrically connecting the vehicle control device 100 to the storage device storing the map information causes the storage device to function as the map database 40.

The HMI 50 is an interface for outputting and inputting information between the passenger of the subject vehicle and the vehicle system 200 (Human Machine Interface, HMI). While examples of the HMI 50 include a display that displays character or image information and a speaker that outputs a sound, such as music or voice, the examples are not limited to these.

A description will be given of transmitting and receiving information via the HMI 50. For example, as soon as the passenger inputs the destination to the HMI 50 for setting the destination, the destination information is output from the HMI 50 to the navigation system 30. This enables the navigation system 30 to obtain the information of the destination of the subject vehicle. For example, when the navigation system 30 generates the planned traveling route to the destination, the information of the planned traveling route is output from the navigation system 30 to the HMI 50. The HMI 50 outputs the information of the planned traveling route from the display and/or the speaker. This causes the information of the planned traveling route to the destination to be presented to the passenger of the subject vehicle. While examples of the information of the planned traveling route to the destination include a route guide and a required period of time to the destination, the examples are not limited to these.

For example, as soon as the passenger inputs an execution command of traffic lane change to the HMI 50 for the subject vehicle to change traffic lanes, execution command information indicating the execution command of traffic lane change is output from the HMI 50 to the vehicle control device 100. This enables the vehicle control device 100 to start control processing of traffic lane change. For example, as soon as the vehicle control device 100 sets a target trajectory for traffic lane change, information of the target trajectory is output from the vehicle control device 100 to the HMI 50. The HMI 50 outputs the information of the target trajectory from the display and/or the speaker. This causes the information of the target trajectory for traffic lane change to be presented to the passenger of the subject vehicle. While examples of the information of the target trajectory for traffic lane change include an approach position identified on the adjacent traffic lane and the target trajectory during the traffic lane change, the examples are not limited to these. Note that the target trajectory and the approach position will be described later.

For example, when a branching traffic lane branching from the subject vehicle traffic lane in which the subject vehicle travels is present in the traveling direction of the subject vehicle, the HMI 50 outputs information of choices whether to travel in a planned traveling lane or not from the display and/or the speaker. The planned traveling lane is a traffic lane in a side of the planned traveling route among the subject vehicle traffic lane and the branching traffic lane. As soon as the driver inputs an approval operation indicating an approval of traveling in the planned traveling lane to the HMI 50, approval operation information indicating the approval operation is output from the HMI 50 to the vehicle control device 100.

The actuator control device 60 controls traveling of the subject vehicle. The actuator control device 60 includes a steering controller mechanism, an accelerator controller mechanism, a brake controller mechanism, an engine controller mechanism, and the like. A control signal is input from the vehicle control device 100, which will be described later, to the actuator control device 60. The actuator control device 60 controls the vehicle control actuator group 70 according to the control signal from the vehicle control device 100, and thus, the automatic driving of the subject vehicle is achieved. For example, when the control signal for moving the subject vehicle from the subject vehicle traffic lane to the adjacent traffic lane is input to the actuator control device 60, the actuator control device 60 calculates a steering angle required for moving the subject vehicle and an accelerator depression amount or a brake depression amount corresponding to the moving speed according to the control signal. The actuator control device 60 outputs the calculated various parameters to the vehicle control actuator group 70.

Note that controls of the respective mechanisms may be performed in a completely automatic manner or may be performed in a form of assisting the driving operation of the driver. The controls of the respective mechanisms can be halted or aborted by an intervention operation of the driver. A travel control method by the actuator control device 60 is not necessarily limited to the above-described control method, and other known methods may be used.

The vehicle control actuator group 70 is various kinds of actuators for driving the subject vehicle. As illustrated in FIG. 1, while examples of the vehicle control actuator group 70 include a steering actuator 71, an accelerator position actuator 72, and a brake control actuator 73, the examples are not limited to these. The steering actuator 71 controls a steering direction and a steering amount of steering of the subject vehicle according to the signal input from the actuator control device 60. The accelerator position actuator 72 controls an accelerator position of the subject vehicle according to the signal input from the actuator control device 60. The brake control actuator 73 controls a braking operation of a braking device of the subject vehicle according to the signal input from the actuator control device 60.

The turn indicator 80 internally has a lamp that flashes, and as soon as the driver of the subject vehicle operates a direction indication switch (not illustrated), the turn indicator 80 lights up in orange. The turn indicator 80 is a device for indicating the direction to the surroundings when the subject vehicle turns right or left or when the subject vehicle changes traffic lanes. The turn indicator 80 is, for example, integrally disposed in the right and left of the front end and the rear end of the subject vehicle.

In the embodiment, a control signal is input from the vehicle control device 100 to the turn indicator 80. The control signal is a signal for actuating the turn indicator and examples of the control signal include a signal that causes the turned-off turn indicator 80 to flash (also referred to as a blinking signal) and a signal that causes the flashing turn indicator 80 to be turned off (also referred to as a turn-off signal). For example, as soon as the blinking signal that causes a left side turn indicator to flash is input to the turn indicator 80, the turn indicator 80 causes the left side turn indicator to be lit up. Thereafter, as soon as the turn-off signal that causes the left side turn indicator to be turned off is input to the turn indicator 80, the turn indicator 80 causes the left side turn indicator to be turned off. Thus, the turn indicator 80 is controlled by the vehicle control device 100 in addition to the driver of the subject vehicle.

Next, a description will be given of the vehicle control device 100. The vehicle control device 100 of the embodiment is configured of a computer including hardware and software, and is configured of a ROM storing programs, a CPU that executes the programs stored in this ROM, and a RAM that functions as an accessible storage device. Note that, for an operation circuit, an MPU, a DSP, an ASIC, an FPGA, and the like may be used instead of the CPU or together with the CPU. A control device 101 illustrated in FIG. 1 corresponds to the CPU (a processor). A storage device 110 illustrated in FIG. 1 corresponds to the ROM and the RAM.

Note that, while the embodiment describes the configuration in which the programs executed by the control device 101 is stored in the storage device 110 in advance as an example, the location where the programs are stored is not limited to the storage device 110.

The control device 101 controls the traveling of the subject vehicle along the planned traveling route generated by the navigation system 30. In the embodiment, the control device 101 determines whether driver operation information by the driver of the subject vehicle indicating the intention of traveling in the planned traveling lane in the planned traveling route side has been obtained or not when a branching traffic lane branching from the subject vehicle traffic lane in which the subject vehicle travels is present in the traveling direction of the subject vehicle on the planned traveling route. The control device 101 controls the vehicle speed based on the road information of the planned traveling lane when determining that the driver operation information has been obtained. For example, when a road structure requiring deceleration of the subject vehicle is present in the traveling direction of the subject vehicle, the control device 101 performs a deceleration control of the subject vehicle.

Figure 2:
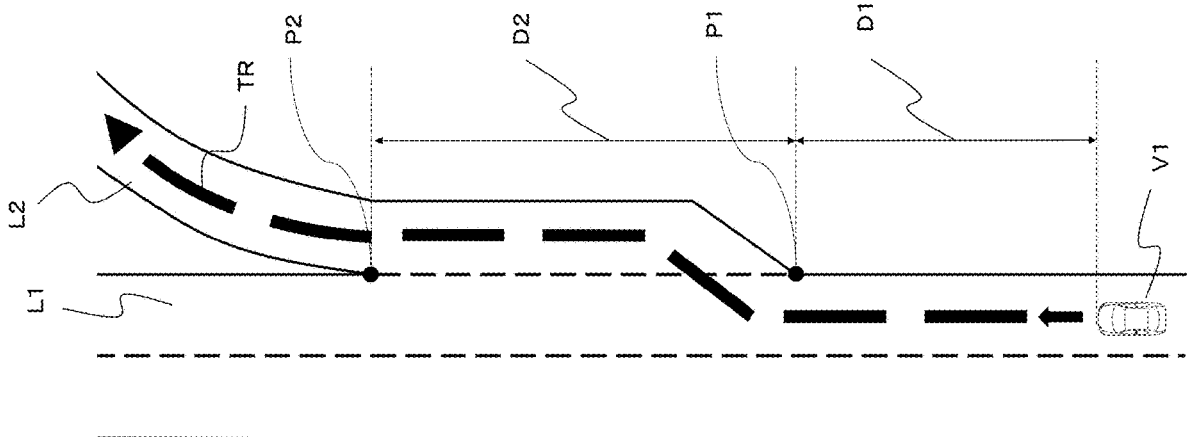
FIG. 2 is a drawing illustrating an exemplary situation where a vehicle control method according to the embodiment is executed.

FIG. 2 is a drawing illustrating an exemplary situation where the vehicle control method according to the embodiment is executed. FIG. 2 is a drawing illustrating a situation where a branching traffic lane L2 that branches from a subject vehicle traffic lane L1 where a subject vehicle V1 travels exists in a traveling direction of the subject vehicle V1. The branching traffic lane L2 is a traffic lane that branches from the subject vehicle traffic lane L1 with a branch point P1 as a starting point, and is a planned traveling lane on a planned traveling route TR of the subject vehicle V1. In the example in FIG. 2, the subject vehicle traffic lane L1 is a straight road, and the branching traffic lane L2 has a curve road. The curve road is a road structure requiring deceleration of the subject vehicle. It is because it is required to decelerate the vehicle speed of the subject vehicle to the vehicle speed set based on the curvature of the curve road before the subject vehicle enters the curve road when there is the curve road on the traffic lane. A target point P2 where the curve road is located is an entrance of the curve road. The control device 101 calculates the target vehicle speed at the target point P2, and calculates a deceleration speed for decelerating the vehicle speed of the subject vehicle to the target vehicle speed until the subject vehicle reaches the target point based on the current vehicle speed of the subject vehicle V1 and the target vehicle speed. In the following description, a description will be given with the example in which the present invention is applied to the vehicle control in the situation illustrated in FIG. 2.

Note that, in the embodiment, the vehicle control method may be executed not limited in the situation illustrated in FIG. 2, but in another situation. For example, the other situation may be a situation where the planned traveling route is set in the subject vehicle traffic lane in the road having the road structure illustrated in FIG. 2. In such a situation, the control device 101 performs a control to accelerate and decelerate the subject vehicle based on the road information of the subject vehicle traffic lane regardless of the existence of the branching traffic lane. The other situation may be a situation where the branching traffic lane is a straight road. The other situation may be a situation where the subject vehicle traffic lane is an expressway and the branching traffic lane has an exit to an ordinary road. The expressway and the ordinary road have different speed limits, and the ordinary road has a lower speed limit than that of the expressway. When the subject vehicle enters the ordinary road passing through the branching traffic lane from the expressway, it is necessary to decelerate the vehicle speed of the subject vehicle to the speed limit of the ordinary road. Therefore, the exit to the ordinary road has a road structure requiring deceleration of the subject vehicle.

As illustrated in FIG. 1, the control device 101 includes a road information obtaining unit 102, an operation information determining unit 103, a deceleration determining unit 104, and a vehicle speed controlling unit 105 as functional blocks. These blocks achieve respective functions, which are described later, by the software established in the ROM. Note that, while in the embodiment, the functions of the respective function blocks are described by dividing the functions that the control device 101 has into four function blocks, the functions of the control device 101 are not necessarily divided into four blocks, and may be divided into three or less function blocks or five or more function blocks.

The road information obtaining unit 102 obtains the road information in the traveling direction of the subject vehicle from the map database 40. For example, the road information obtaining unit 102 obtains the road information at a point apart from the current position of the subject vehicle by a predetermined distance in the traveling direction of the subject vehicle at a constant cycle while the subject vehicle is traveling. When the branching traffic lane that branches from the subject vehicle traffic lane exists in the traveling direction of the subject vehicle on the planned traveling route, the road information includes the road information of the subject vehicle traffic lane and the road information of the branching traffic lane. The road information of the branching traffic lane includes a position of the branch point, a curvature of the curve road, and a position of the entrance of the curve road. The position of the branch point may be obtained as, for example, a distance from the current position of the subject vehicle to the branch point. The road information of the branching traffic lane includes a distance from the branch point to the entrance of the curve road. In the example in FIG. 2, a distance D1 is a distance from the current position of the subject vehicle V1 to the branch point P1, and a distance D2 is a distance from the branch point P1 to the entrance of the curve road (the target point P2).

Note that, for example, when the subject vehicle traffic lane is an expressway, and the branching traffic lane has an exit to an ordinary road, not a curve road, traffic lane information obtained by the road information obtaining unit 102 includes a position of the exit to the ordinary road and a speed limit in the ordinary road.

The operation information determining unit 103 determines whether the driver operation information by the driver indicating the intention of traveling in the planned traveling lane with the branching traffic lane as the planned traveling lane on the planned traveling route has been obtained or not. That is, the operation information determining unit 103 determines whether the driver has the intention of traveling in the branching traffic lane as the planned traveling route or not when there is the branching traffic lane branching from the subject vehicle traffic lane. The driver operation information is information regarding an operation executed by the driver while the subject vehicle is traveling after the planned traveling route is set. That is, the driver operation information does not include an input operation of the destination information by the driver.

For example, the driver operation information includes approval operation information indicating an approval by the driver of traveling in the branching traffic lane as the planned traveling route. That is, the approval operation information is information indicating an approval by the driver of performing traffic lane change to the branching traffic lane. The operation information determining unit 103 presents the map information and the information of the planned traveling route of the subject vehicle to the driver via the HMI 50, and presents information of choices whether to travel in the branching traffic lane or not. As soon as the driver performs the approval operation of traveling in the branching traffic lane via the HMI 50, the operation information determining unit 103 obtains the approval operation information from the HMI 50.

The driver operation information may be turn indicator operation information indicating a turn indicator operation by the driver for traffic lane change to the planned traveling lane. For example, the operation information determining unit 103 presents the map information and the information of the planned traveling route of the subject vehicle to the driver via the HMI 50. As soon as the driver operates the direction indication switch to the branching traffic lane side as the planned traveling lane in a state where it is presented that the branching traffic lane is in the planned traveling route side, the operation information determining unit 103 obtains the turn indicator operation information from the direction indication switch.

The driver operation information is steering control information indicating steering control by the driver for traffic lane change to the planned traveling lane. The operation information determining unit 103 presents the map information and the information of the planned traveling route of the subject vehicle to the driver via the HMI 50. As soon as the driver operates the steering to the branching traffic lane side as the planned traveling lane, the operation information determining unit 103 obtains the steering control information. For example, the operation information determining unit 103 identifies a positional relation between the current position of the subject vehicle and the traffic lane line based on the captured image captured by the imaging device 12 and the map information of the map database 40, and obtains the steering control information when the subject vehicle straddles the traffic lane line between the subject vehicle traffic lane and the branching traffic lane.

As described above, the operation information determining unit 103 determines that the driver operation information has been obtained when at least any one of the approval operation information, the turn indicator operation information, and the steering control information is obtained. For example, the operation information determining unit 103 determines that the driver operation information has been obtained when the approval operation information has been obtained until the subject vehicle reaches the range within the predetermined distance from the branch point or when the turn indicator operation information or the steering control information has been obtained until the subject vehicle reaches the point at which the traffic lane change to the branching traffic lane is appropriately executable.

The deceleration determining unit 104 determines whether a road structure requiring deceleration of the subject vehicle is present or not in the planned traveling lane based on the road information of the planned traveling lane. For example, the deceleration determining unit 104 determines that the road structure requiring deceleration of the subject vehicle is present in the branching traffic lane when there is a curve road in the branching traffic lane as the planned traveling lane. The deceleration determining unit 104 determines that there is no road structure requiring deceleration of the subject vehicle in the branching traffic lane when there is no curve road in the branching traffic lane.

Note that, when there is an exit to an ordinary road in the branching traffic lane, the deceleration determining unit 104 determines that the road structure requiring deceleration of the subject vehicle is present in the branching traffic lane. While in the embodiment, whether a road structure requiring deceleration of the subject vehicle is present or not is determined based on whether the road information of the branching traffic lane includes a curve road or not, the embodiment is not limited to this, and, for example, a target vehicle speed is calculated from the curvature of the branching traffic lane obtained as the road information of the branching traffic lane, and when the target vehicle speed is smaller than the current vehicle speed of the subject vehicle, a road structure requiring deceleration of the subject vehicle may be determined to be present in the branching traffic lane.

The deceleration determining unit 104 determines whether a road structure requiring deceleration of the subject vehicle is present or not in an opposite side traffic lane based on road information of the opposite side traffic lane of a side opposite to the planned traveling lane. In the example in FIG. 2, the opposite side traffic lane is the subject vehicle traffic lane. For example, the deceleration determining unit 104 determines whether a road structure requiring deceleration of the subject vehicle is present or not in the subject vehicle traffic lane when the driver operation information has not been obtained until the point at which the traffic lane change to the branching traffic lane is appropriately executable on the subject vehicle traffic lane. Note that, in the embodiment, the determination by the operation information determining unit 103 and the determination by the deceleration determining unit 104 may be concurrently processed or any one of the determinations may be precedingly executed. For example, after the determination by the operation information determining unit 103, depending on whether the driver operation information has been obtained or not, the deceleration determining unit 104 may determines whether a road structure requiring deceleration of the subject vehicle is present or not in a traffic lane in which the driver intends to travel.

When the driver operation information has been determined to be obtained and the road structure requiring deceleration of the subject vehicle is determined to be present in the branching traffic lane, the vehicle speed controlling unit 105 performs a deceleration control for decelerating the vehicle speed of the subject vehicle to the target vehicle speed until the subject vehicle reaches the target point. The target point is a point where the road structure requiring deceleration of the subject vehicle is located and is, for example, an entrance of a curve road. The vehicle speed controlling unit 105 calculates a deceleration speed based on the road information of the planned traveling lane and the vehicle information of the subject vehicle, and performs the deceleration control of the subject vehicle based on the calculated deceleration speed.

The vehicle speed controlling unit 105 determines the point where the road structure requiring deceleration of the subject vehicle is located as a target point based on the road information of the branching traffic lane. For example, the vehicle speed controlling unit 105 determines the point where an entrance of a curve road is located as a target point. Note that, when an exit to an ordinary road in the branching traffic lane is present, the vehicle speed controlling unit 105 determines the point where the exit to the ordinary road is located as the target point.

The vehicle speed controlling unit 105 calculates a target vehicle speed at the target point after the target point is determined. For example, the vehicle speed controlling unit 105 calculates the target vehicle speed corresponding to the curvature of the branching traffic lane at the target point. The vehicle control device 100 stores a map that associates the curvature of the traffic lane with the target vehicle speed. The map is set such that the target vehicle speed is decreased as the curvature of the traffic lane increases. The vehicle speed controlling unit 105 refers to the map and calculates the target vehicle speed corresponding to a curvature of the branching traffic lane at the target point. Note that, when there is an exit to an ordinary road in the branching traffic lane, the vehicle speed controlling unit 105 calculates the speed limit in the ordinary road as the target vehicle speed.

The vehicle speed controlling unit 105 obtains the current vehicle speed of the subject vehicle as the vehicle information from the vehicle sensor group 20. The vehicle speed controlling unit 105 calculates the deceleration speed based on the current vehicle speed of the subject vehicle and the target vehicle speed. The deceleration speed is, for example, a deceleration speed when it is assumed that deceleration takes place at a constant deceleration speed from the current vehicle speed of the subject vehicle to the target vehicle speed. The vehicle speed controlling unit 105 calculates the deceleration speed large when a vehicle speed difference between the current vehicle speed of the subject vehicle and the target vehicle speed is large. The vehicle speed controlling unit 105 generates a deceleration command that decelerates the subject vehicle at the calculated deceleration speed after the deceleration speed is calculated, and outputs the generated deceleration command to the actuator control device 60.

In the embodiment, the vehicle speed controlling unit 105 may set an allowable deceleration speed and a deceleration starting point where the deceleration control is started based on the distance from the current position of the subject vehicle to the branch point of the branching traffic lane and the distance from the branch point to the target point. The allowable deceleration speed is a value set in advance, and is, for example, set corresponding to the distance from the current position of the subject vehicle to the branch point.

The vehicle speed controlling unit 105 sets the deceleration starting point based on the target vehicle speed, the deceleration speed, and the target point. For example, the vehicle speed controlling unit 105 sets the deceleration starting point such that deceleration to the target vehicle speed is possible based on the deceleration speed before the subject vehicle reaches the target point. Next, the vehicle speed controlling unit 105 sets the allowable deceleration speed to the maximum allowable deceleration speed when the distance from the deceleration starting point to the target point is shorter than the distance from the branch point to the target point, that is, when the deceleration starting point is located in a downstream side (on the branching traffic lane) with respect to the branch point. The maximum allowable deceleration speed is the maximum deceleration speed specified by adaptive cruise control (ACC), and is, for example, 0.1 G to 0.2 G.

The vehicle speed controlling unit 105 sets the allowable deceleration speed corresponding to the distance from the current position of the subject vehicle to the branch point when the distance from the deceleration starting point to the target point is longer than the distance from the branch point to the target point, that is, when the deceleration starting point is located in an upstream side (on the subject vehicle traffic lane) with respect to the branch point. The vehicle control device 100 stores the map that associates the distance from the current position of the subject vehicle to the branch point with the allowable deceleration speed. The vehicle speed controlling unit 105 refers to the map and sets the allowable deceleration speed corresponding to the distance from the current position of the subject vehicle to the branch point.

Figure 3:
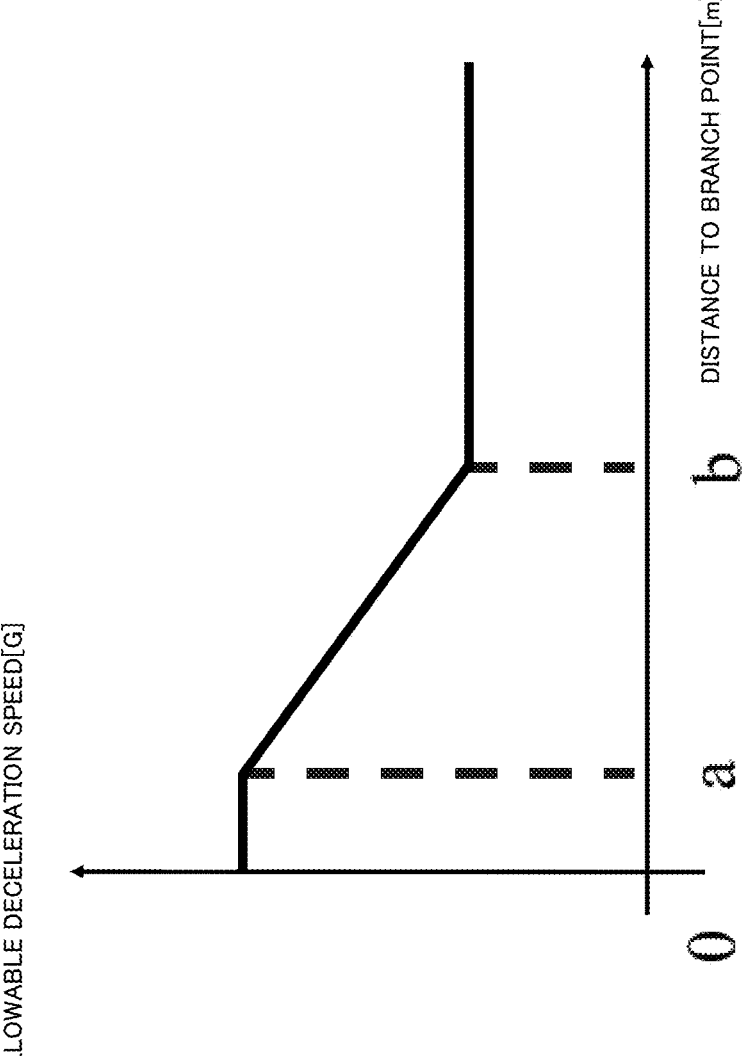
FIG. 3 is a drawing illustrating a relation between an allowable deceleration speed and a distance to a branch point according to the embodiment.

FIG. 3 is a drawing illustrating an exemplary map associating the distance from the current position of the subject vehicle to the branch point with the allowable deceleration speed. As illustrated in FIG. 3, the map is set such that the allowable deceleration speed is decreased as the distance from the current position of the subject vehicle to the branch point is long. The allowable deceleration speed is set to the maximum allowable deceleration speed up to a point apart from the branch point by a predetermined distance a. The predetermined distance a is a distance set in advance, and is, for example, 5 m to 10 m. The allowable deceleration speed is set to the minimum allowable deceleration speed at a point apart from the branch point by a predetermined distance b or more. The predetermined distance b is a distance set in advance, and is a range close to the branch point to the extent that the traffic flow on the subject vehicle traffic lane is not interfered even when the deceleration control is started. The minimum allowable deceleration speed is a deceleration speed set in advance, and is, for example, a deceleration speed corresponding to an engine brake.

The vehicle speed controlling unit 105 determines whether the deceleration speed is equal to or less than the allowable deceleration speed or not by comparing the set allowable deceleration speed with the calculated deceleration speed. For example, the vehicle speed controlling unit 105 generates a deceleration command that decelerates the subject vehicle at the calculated deceleration speed when the calculated deceleration speed is equal to or less than the allowable deceleration speed. For example, the vehicle speed controlling unit 105 updates the deceleration speed to the allowable deceleration speed and generates a deceleration command that decelerates the subject vehicle at the deceleration speed after the update when the calculated deceleration speed is not equal to or less than the allowable deceleration speed.

The vehicle speed controlling unit 105 updates the deceleration starting point based on the deceleration speed after the update when the deceleration speed is updated. As describes above, the vehicle speed controlling unit 105 generates the deceleration command that decelerates the subject vehicle at the calculated deceleration speed from the deceleration starting point, and outputs the generated deceleration command to the actuator control device 60.

Note that, while in the embodiment, the vehicle speed controlling unit 105 calculates the deceleration speed and performs the deceleration control of the subject vehicle based on the calculated deceleration speed, the embodiment is not limited to this. For example, the vehicle speed controlling unit 105 may calculate a target vehicle speed at the target point, and may perform the deceleration control of the subject vehicle to the target vehicle speed.

The vehicle speed controlling unit 105 generates a vehicle speed command to control the vehicle speed of the subject vehicle based on the road information of the branching traffic lane when the driver operation information has been determined to be obtained and no road structure requiring deceleration of the subject vehicle is determined to be present. Note that, in the embodiment, when the driver operation information has been determined not to be obtained, that is, when the travel in the branching traffic lane along the planned traveling route does not take place, a planned traveling route traveling in the subject vehicle traffic lane and traveling to the destination is newly generated, and the planned traveling route is updated to the newly generated planned traveling route. In such a case, the vehicle speed controlling unit 105 generates a vehicle speed command to control the vehicle speed of the subject vehicle based on the road information of the subject vehicle traffic lane on the newly generated planned traveling route.

For example, when the driver operation information has been determined not to be obtained and the road structure requiring deceleration of the subject vehicle is determined to be present in the subject vehicle traffic lane, the vehicle speed controlling unit 105 generates a deceleration command that performs the deceleration control of the subject vehicle. A generation method of the deceleration command is similar to the generation method of the deceleration command in the branching traffic lane described above. This enables avoiding execution of the deceleration control according to the road information of the planned traveling lane against the intention of the driver when the driver does not have the intention of traveling as the planned traveling route in the embodiment. When the driver operation information has been determined not to be obtained and no road structure requiring deceleration of the subject vehicle is determined to be present in the subject vehicle traffic lane, the vehicle speed controlling unit 105 generates a vehicle speed command to control the vehicle speed of the subject vehicle based on the road information of the subject vehicle traffic lane.

Figure 4:
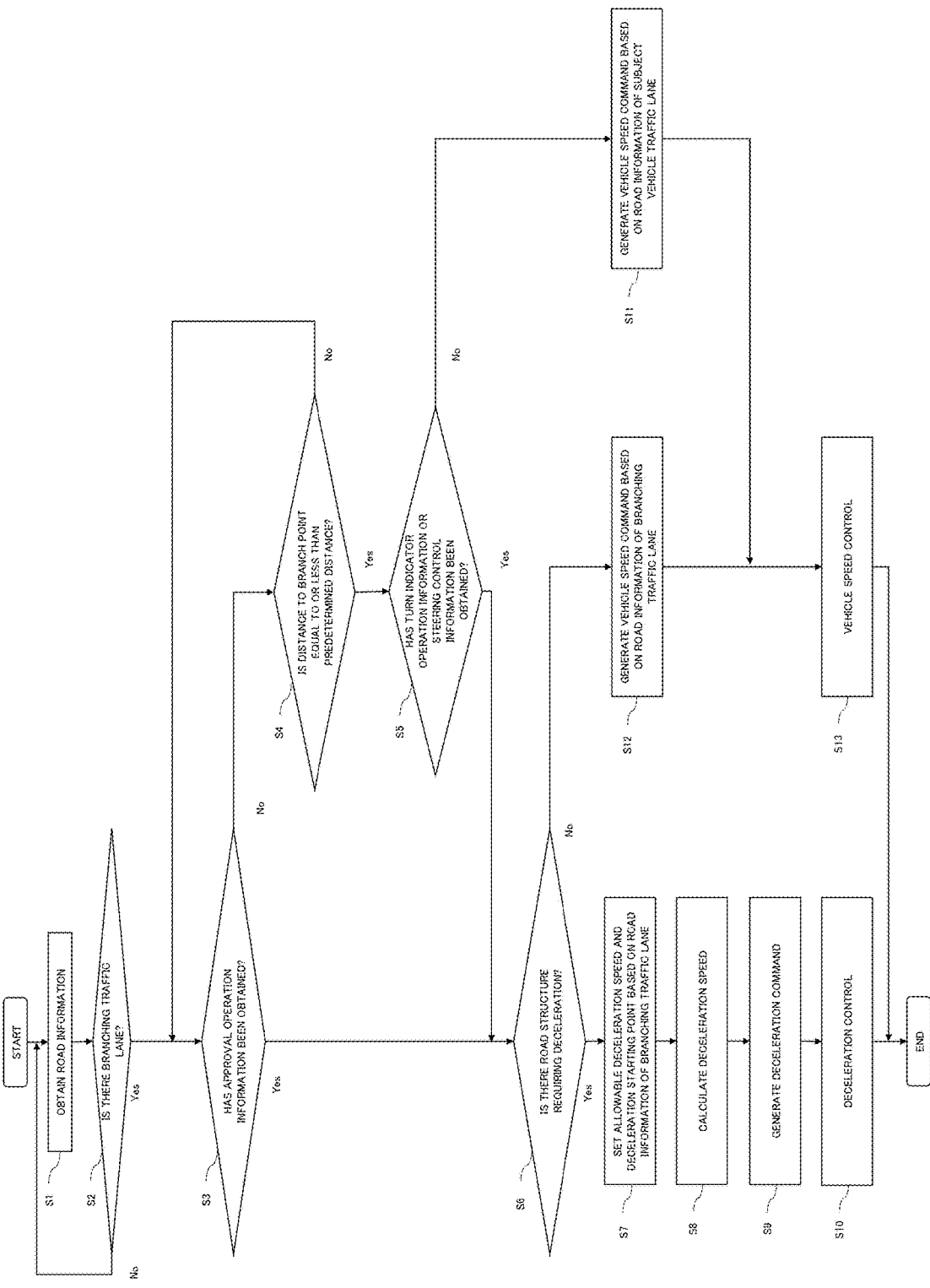
FIG. 4 is a flowchart illustrating an exemplary procedure of executing the vehicle control method according to the embodiment.

Next, an exemplary control according to the vehicle control method executed by the vehicle control device 100 will be described. FIG. 4 is a flowchart of illustrating a control flow for executing the vehicle control method of the subject vehicle in the vehicle control device 100. In the embodiment, as soon as the subject vehicle starts to travel, the control device 101 starts the control flow from Step S1.

At Step S1, the control device 101 obtains road information in the traveling direction of the subject vehicle from the map database 40. The control device 101 obtains road information of the subject vehicle traffic lane and road information of the branching traffic lane when there is a branching traffic lane that branches from the subject vehicle traffic lane in the subject vehicle traffic lane. At Step S2, the control device 101 determines whether there is a branching traffic lane in the traveling direction of the subject vehicle or not. For example, when the road information including the road information of the branching traffic lane is obtained at Step S1, the control device 101 determines that there is a branching traffic lane in the traveling direction of the subject vehicle. The control device 101 proceeds with the process to Step S3 when there is the branching traffic lane in the traveling direction of the subject vehicle. When determining that no branching traffic lane is present in the traveling direction of the subject vehicle, the control device 101 returns the process to Step S1 and repeats the following process.

At Step S3, the control device 101 determines whether approval operation information of traveling in the branching traffic lane as the planned traveling lane has been obtained or not. For example, the control device 101 presents the planned traveling route and choices whether to approve the traveling in the branching traffic lane as the planned traveling lane or not via the HMI 50. For example, as soon as the driver inputs the approval operation, the control device 101 obtains the approval operation information. When determining that the approval operation information has been obtained, the control device 101 proceeds with the process to Step S6. When determining that the approval operation information has not been obtained, the control device 101 proceeds with the process to Step S4.

At Step S4, the control device 101 determines whether the distance from the current position of the subject vehicle to the branch point is equal to or less than a predetermined distance or not. When determining that the distance from the current position of the subject vehicle to the branch point is equal to or less than the predetermined distance, the control device 101 proceeds with the process to Step S5. When determining that the distance from the current position of the subject vehicle to the branch point is not equal to or less than the predetermined distance, the control device 101 returns the process to Step S3, and repeats the following process.

At Step S5, the control device 101 determines whether turn indicator operation information or steering control information has been obtained or not. For example, the control device 101 determines that the turn indicator operation information or the steering control information has been obtained when the driver performs a turn indicator operation or a steering operation. When determining that the turn indicator operation information or the steering control information has been obtained, the control device 101 proceeds with the process to Step S6. When determining that the turn indicator operation information or the steering control information has not been obtained, the control device 101 proceeds with the process to Step S11. As described above, when any one of the approval operation information, the turn indicator operation information, and the steering control information has been obtained as the driver operation information, the control device 101 proceeds with the process to Step S6, and when none of the approval operation information, the turn indicator operation information, or the steering control information has been obtained as the driver operation information, the control device 101 proceeds with the process to Step S11.

At Step S6, the control device 101 determines whether there is a road structure requiring deceleration of the subject vehicle in the branching traffic lane as the planned traveling lane or not. When determining that the road structure requiring deceleration of the subject vehicle is present in the branching traffic lane, the control device 101 proceeds with the process to Step S7. When determining that no road structure requiring deceleration of the subject vehicle is present in the branching traffic lane, the control device 101 proceeds with the process to Step S12.

At Step S7, the control device 101 sets an allowable deceleration speed and a deceleration starting point based on the road information of the branching traffic lane. For example, the control device 101 calculates a deceleration speed based on the road information of the branching traffic lane, a target vehicle speed calculated from the vehicle information of the subject vehicle, and the current vehicle speed of the subject vehicle, and sets the deceleration start position based on the target vehicle speed, the deceleration speed, and the target point. The control device 101 sets an allowable deceleration speed based on the road information of the branching traffic lane. At Step S8, the control device 101 calculates the deceleration speed based on the allowable deceleration speed. At Step S9, the control device 101 generates a deceleration command to decelerate the subject vehicle at the deceleration speed calculated at Step S9 from the deceleration start position. At Step S10, the control device 101 performs the deceleration control of the subject vehicle. For example, the control device 101 outputs the deceleration command to the actuator control device 60. As described above, in the embodiment, when the planned traveling route is set in the branching traffic lane, an acceleration and deceleration control of the subject vehicle based on the road information of the branching traffic lane is performed on the condition that the driver operation information is obtained.

At Step S11, the control device 101 generates a vehicle speed command based on the road information of the subject vehicle traffic lane. At Step S12, the control device 101 generates a vehicle speed command based on the road information of the branching traffic lane. At Step S13, the control device 101 performs a vehicle speed control based on the generated vehicle speed commands. For example, the control device 101 outputs the generated vehicle speed commands to the actuator control device 60. In the embodiment, when the driver has the intention of not traveling as the planned traveling route, the control device 101 controls the vehicle speed based on the road information of the traffic lane in the opposite side of the planned traveling lane, not the road information of the planned traveling lane. This enables avoiding the deceleration control against the intention of the driver.

Note that, while in the embodiment, after whether the driver operation information has been obtained or not is determined, whether a road structure requiring deceleration of the subject vehicle is present or not is determined, the order of the determinations is not specifically limited. For example, after whether a road structure requiring deceleration of the subject vehicle is present or not is determined, the determination of whether the driver operation information has been obtained or not may be made, or both determinations may be concurrently processed. When determining that the driver operation information has been obtained and determining that the road structure requiring deceleration of the subject vehicle is present, the control device 101 may proceed with the process to Step S7, and when determining that the driver operation information has been obtained and determining that no road structure requiring deceleration of the subject vehicle is present, the control device 101 may proceed with the process to Step S12. For example, when determining that the driver operation information has not been obtained and determining that the road structure requiring deceleration is present, the control device 101 performs a deceleration control based on the road information of the subject vehicle traffic lane at Step S11. For example, when determining that the driver operation information has not been obtained and determining that no road structure requiring deceleration is present, the control device 101 performs a vehicle speed control based on the road information of the subject vehicle traffic lane at Step S11.

As described above, in the embodiment, when a branching traffic lane branching from the subject vehicle traffic lane in which the subject vehicle travels is present in the traveling direction of the subject vehicle on the planned traveling route, the processor obtains the road information of the subject vehicle traffic lane and the road information of the branching traffic lane, determines whether the driver operation information by the driver of the subject vehicle indicating the intention of traveling on the planned traveling route has been obtained or not, with the branching traffic lane as the planned traveling lane on the planned traveling route, determines whether the road structure requiring deceleration of the subject vehicle is present or not in the planned traveling lane based on the road information of the planned traveling lane, and performs the deceleration control of the subject vehicle based on the road information of the planned traveling lane and the vehicle information of the subject vehicle when determining that the driver operation information has been obtained and determining that the road structure requiring deceleration of the subject vehicle is present in the planned traveling lane. This enables decelerating the subject vehicle corresponding to the intention of the driver to travel on the planned traveling route when there is the road structure requiring deceleration of the subject vehicle in the traffic lane in the planned traveling route side in the situation where the branching side traffic lane branching from the subject vehicle traffic lane in which the subject vehicle travels is present.

In the embodiment, the processor sets the allowable deceleration speed and the deceleration starting point at which the deceleration control is started based on the distance from the current position of the subject vehicle to the branch point of the branching traffic lane and the distance from the branch point to the target point where the road structure is located, calculates the deceleration speed of the subject vehicle based on the allowable deceleration speed, and performs the deceleration control for decelerating the subject vehicle at the deceleration speed from the deceleration starting point. This enables decelerating the vehicle speed of the subject vehicle with more certainty before the subject vehicle travels on the road structure requiring deceleration.

In the embodiment, when the approval operation information indicating the approval by the driver of traveling in the planned traveling lane or the turn indicator operation information indicating the turn indicator operation by the driver for the traffic lane change to the planned traveling lane is obtained as the driver operation information, the processor determines whether the road structure requiring deceleration of the subject vehicle is present or not in the planned traveling lane based on the road information of the planned traveling lane. This enables determining that the driver has the intention of traveling in the traffic lane in the planned traveling route side when the driver has performed the approval operation of traveling in the planned traveling lane or when the driver has performed the turn indicator operation to the planned traveling lane side.

In the embodiment, when the steering control information indicating steering control by the driver for the traffic lane change to the planned traveling lane is obtained as the driver operation information, the processor determines whether the road structure requiring deceleration of the subject vehicle is present or not in the planned traveling lane based on the road information of the planned traveling lane. This enables determining that the driver has the intention of traveling in the traffic lane in the planned traveling route side when the driver has performed the steering control to the planned traveling lane side.

Note that the embodiment described above has been described for ease of understanding the present invention, and has not been described for limiting the present invention. Accordingly, each component disclosed in the above-described embodiment has the gist of including all the design changes and equivalents falling within the technical scope of the present invention.

DESCRIPTION OF REFERENCE NUMERALS

100 Vehicle control device
101 Control device (processor)
102 Road information obtaining unit
103 Operation information determining unit
104 Deceleration determining unit
105 Vehicle speed controlling unit

The invention claimed is:

1. A vehicle control method executed by a processor for controlling travel of a subject vehicle along a planned traveling route from a current position of the subject vehicle to a destination, the processor operating to:

obtain road information of a subject vehicle traffic lane in which the subject vehicle travels and road information of a branching traffic lane branching from the subject vehicle traffic lane when the branching traffic lane is present in a traveling direction of the subject vehicle on the planned traveling route;

determine whether driver operation information by a driver of the subject vehicle indicating an intention of traveling in a planned traveling lane on the planned traveling route has been obtained or not, with the branching traffic lane as the planned traveling lane;

determine whether a road structure requiring deceleration of the subject vehicle is present or not in the planned traveling lane based on road information of the planned traveling lane;

perform a deceleration control of the subject vehicle based on the road information of the planned traveling lane and vehicle information of the subject vehicle when determining that the driver operation information has been obtained and determining that the road structure requiring deceleration of the subject vehicle is present in the planned traveling lane; and perform a vehicle speed control of the subject vehicle based on the road information of the subject vehicle traffic lane and the vehicle information of the subject vehicle when determining that the driver operation information has not been obtained.

2. The vehicle control method according to claim 1, wherein the processor operates to:

set an allowable deceleration speed and a deceleration starting point at which the deceleration control is started based on a distance from the current position of the subject vehicle to a branch point of the branching traffic lane and a distance from the branch point to a target point at which the road structure is located;

calculate a deceleration speed of the subject vehicle based on the allowable deceleration speed; and perform the deceleration control for decelerating the subject vehicle at the deceleration speed from the deceleration starting point.

3. The vehicle control method according to claim 1, wherein the processor operates to:

determine whether the road structure requiring deceleration of the subject vehicle is present or not in the planned traveling lane based on the road information of the planned traveling lane when approval operation information indicating an approval by the driver of traveling in the planned traveling lane or a turn indicator operation information indicating a turn indicator operation by the driver for traffic lane change to the planned traveling lane has been obtained as the driver operation information.

4. The vehicle control method according to claim 1, wherein the processor operates to:

determine whether the road structure requiring deceleration of the subject vehicle is present or not in the planned traveling lane based on the road information of the planned traveling lane when steering control information indicating a steering control by the driver for traffic lane change to the planned traveling lane has been obtained as the driver operation information.

5. A vehicle control device comprising a processor for controlling travel of a subject vehicle along a planned traveling route from a current position of the subject vehicle to a destination, wherein the processor is configured to:

obtain road information of a subject vehicle traffic lane in which the subject vehicle travels and road information of a branching traffic lane branching from the subject vehicle traffic lane when the branching traffic lane is present in a traveling direction of the subject vehicle on the planned traveling route;

determine whether driver operation information by a driver of the subject vehicle indicating an intention of traveling in a planned traveling lane on the planned traveling route has been obtained or not, with the branching traffic lane as the planned traveling lane;

determine whether a road structure requiring deceleration of the subject vehicle is present or not in the planned traveling lane based on road information of the planned traveling lane;

perform a deceleration control of the subject vehicle based on the road information of the planned traveling lane and vehicle information of the subject vehicle when determining that the driver operation information has been obtained and determining that the road structure requiring deceleration of the subject vehicle is present in the planned traveling lane; and perform a vehicle speed control of the subject vehicle based on the road information of the subject vehicle traffic lane and the vehicle information of the subject vehicle when determining that the driver operation information has not been obtained.

* * * * *